Jan. 13, 1942.  W. W. KEMPHERT ET AL  2,269,821
SHEAVE
Filed Oct. 16, 1940   2 Sheets-Sheet 1
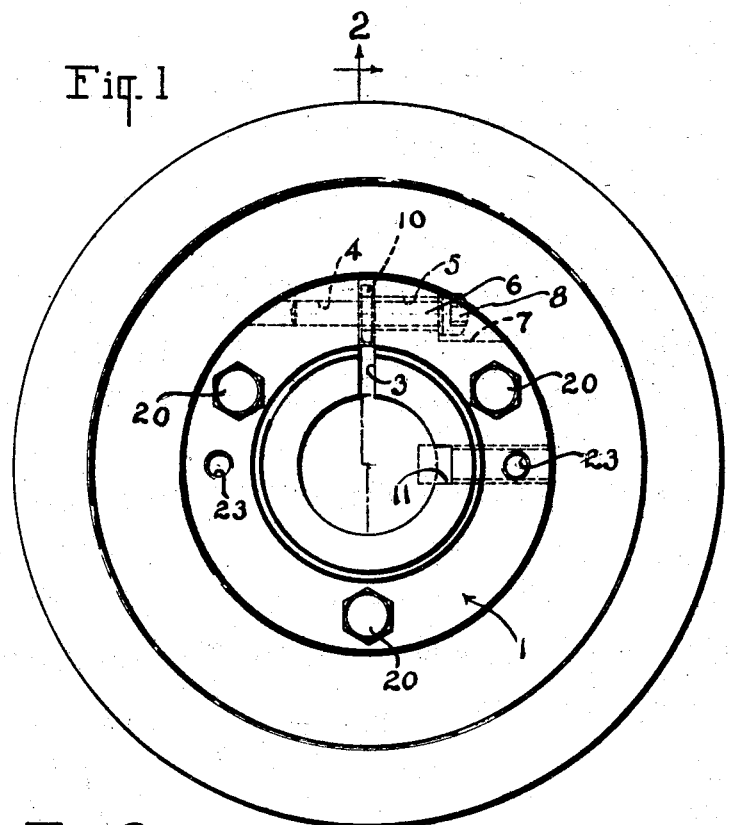
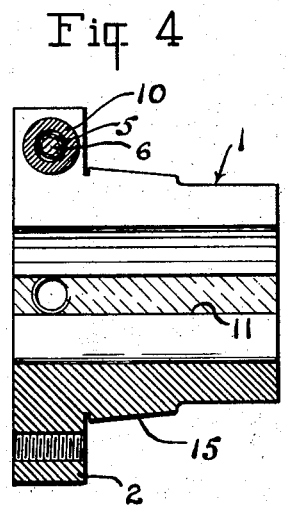
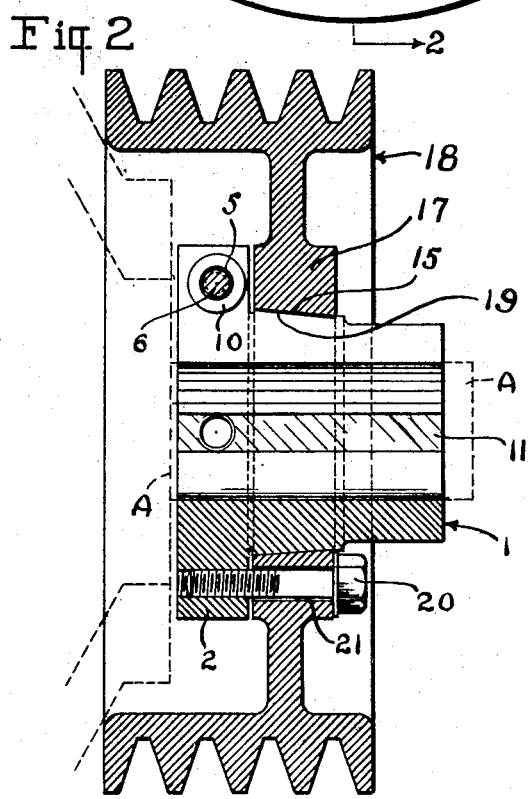
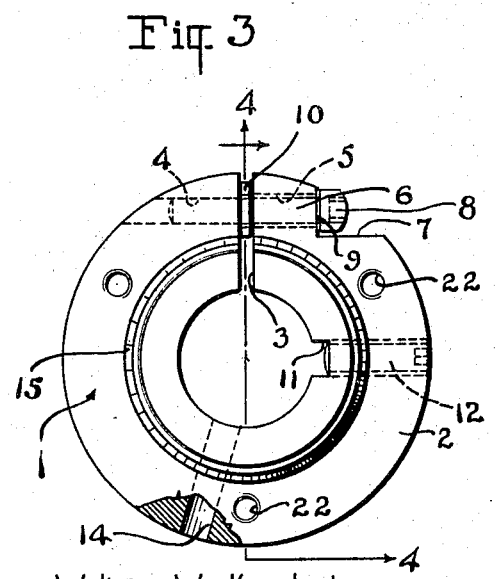
Walter W. Kemphert
Draper E. Tessendorf
INVENTORS
BY *Rob Dwyer*
ATTORNEY Walter W. Kemphert
Draper E. Tessendorf
INVENTOR Patented Jan. 13, 1942

2,269,821

UNITED STATES PATENT OFFICE 2,269,821

SHEAVE

Walter W. Kemphert, Maplewood, N. J., and Draper E. Tessendorf, Fort Worth, Tex., assignors to Worthington Pump and Machinery Corporation, Harrison, N. J., a corporation of Delaware Application October 16, 1940, Serial No. 361,408

1 Claim. (Cl. 74—230.1)

This invention relates to sheaves, pulleys, and the like machine elements, and more particularly to sheaves of the grooved type employed in single or multiple V-belt power transmission drives, particularly adaptable for use in connection with the short stub shaft extensions as used in present day practice on electric motors, internal combustion engine clutch shafts, etc., although the invention is equally applicable for use on long shafts such as line shafts or jack shafts.

An object of the invention is to provide an easily mounted and easily dismantled sheave assembly so constructed as to insure a "press" fit on a shaft and so designed as to permit the changing of the sheave or pulley rim without disturbing the hub element on the shaft and also to provide a sheave or pulley assembly unit which will give a minimum amount of shaft or bearing stress when load is being transmitted through the shaft upon which the sheave or pulley assembly is mounted.

Other objects of the invention are to provide means for preventing breaking or cracking of the split hub member of the unit in the event the shaft upon which it is mounted is appreciably smaller in diameter than the diameter of the bore of the hub, and to provide a balanced hub, i. e. a hub so constructed that unevenness in weight of the parts thereof is balanced to provide uniform distribution of weight, insure uniform rotation, and eliminate shaft and bearing stresses.

The present application is a continuation-in-part of our prior application, Serial Number 213,628.

With these and other objects in view, as may appear from the accompanying specification, the invention consists of various features of construction and combination of parts, which will be first described in connection with the accompanying drawings, showing a sheave of the preferred form embodying the invention, and the features forming the invention will be specifically pointed out in the claim.

In the drawings:

Figure 1 is an end elevation of the improved sheave.

Figure 2 is a cross-section through the sheave taken on the line 2—2 of Figure 1.

Figure 3 is an end elevation of the hub member, as shown in Figures 1 and 2, with the rim element removed.

Figure 4 is a vertical section through the hub member taken on the line 4—4 of Figure 3.

Figure 5:
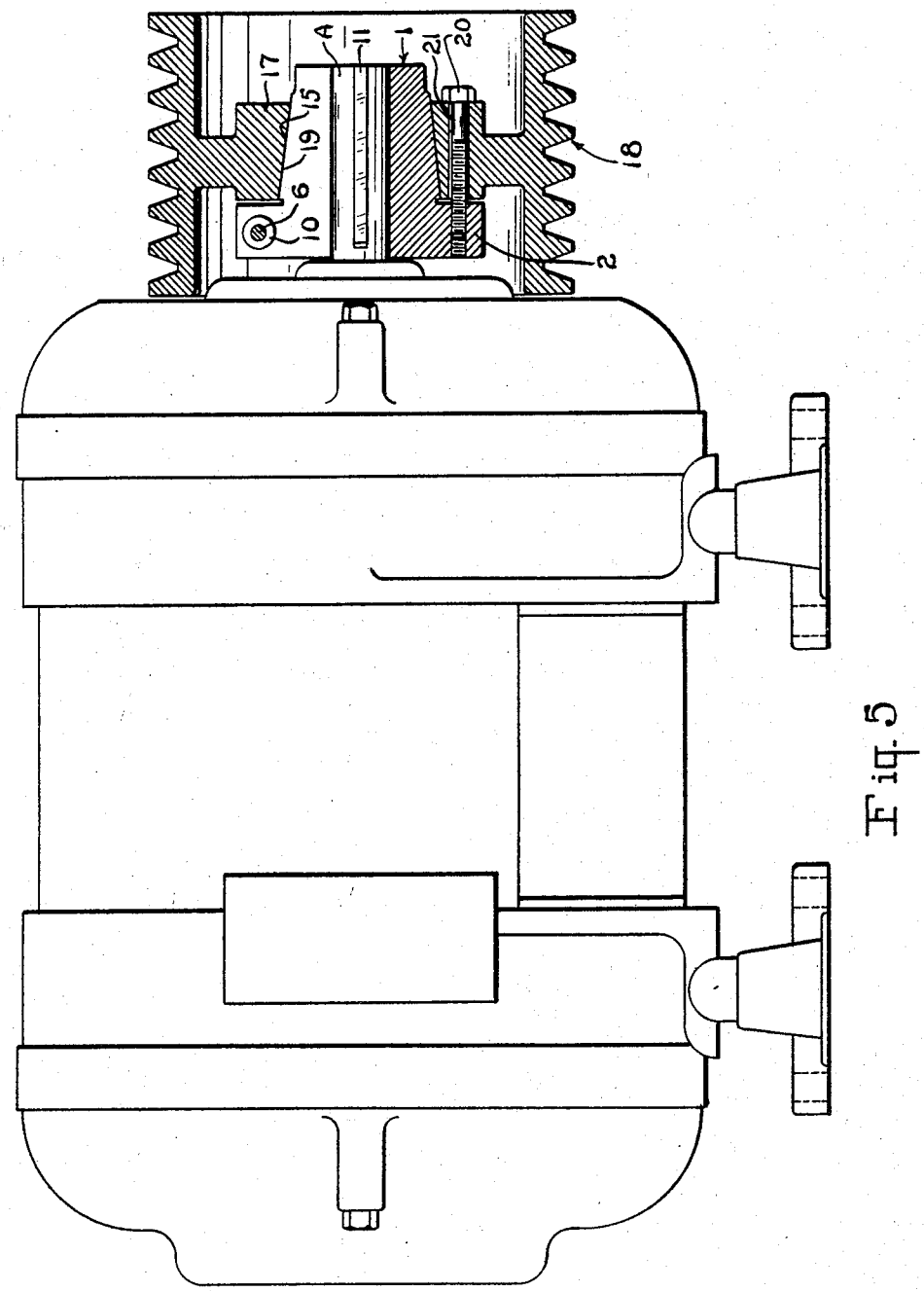
Figure 5 is a sectional view of a sheave constructed in accordance with the present invention and showing it mounted upon a motor shaft.

Referring more particularly to the drawings, the improved demountable sheave unit comprises the hub element 1, which has an annular flange 2 on its inner end. The hub 1 and flange 2 are split longitudinally on one of the radii of the hub, as shown at 3, to permit the hub to be quickly and easily mounted upon a shaft, as shown at A in dotted lines, in Figure 2 of the drawings.

The flange 2 is provided with a threaded hole 4 extending tangentially and across one side of the split 3, and a smooth hole 5 on the other side of the split 3, aligning with the threaded hole 4. A clamp screw 6 is placed through the smooth hole 5 and threaded into the threaded hole 4 for closing the split 3 and clamping the hub 1 firmly upon a shaft. The flange 2 is provided with a cut-away portion, shown at 7, for receiving the head 8 of the clamp screw. This cut-away portion 7 provides a shoulder 9 against which the head 8 engages for drawing the sides of the split 3 towards each other, thus securely clamping the hub 1 upon a shaft. A spacing washer 10 is mounted upon the clamp screw 6, between the faces of the split 3, providing a limiting means for limiting the closing of the split 3, consequently preventing breakage of the hub element 1.

The hub element 1 is provided with a key-way 11, adapted to engage a key carried by a shaft. A set screw, indicated at 12, is threaded radially through the flange 2 for engaging a key carried by the shaft for holding said key in place during the mounting of the hub upon the shaft.

The cutting away of the metal to provide the split 3 causes an unbalancing of the hub element 1. If not compensated for, this results in an unbalanced hub, causing stresses on the shaft and bearing when load is applied. For the purpose of balancing the hub and overcoming the disadvantages of such an unbalanced condition, the flange 2 is provided with a radially extending hole 14, which is approximately diametrically opposite the split 3, serving to balance the weight of the hub.

At least a portion of the outer surface of the hub is tapered, as shown at 15. While in the drawings this tapered portion 15 is shown as relatively short, extending only over a portion of the length of the hub, it is to be understood that the present invention is not limited to any length of the taper.

The taper 15 of the hub element 1 is provided for the reception thereon of the collar 17 of the rim 18, which collar is provided with a taper 19, conforming to the taper 15 of the hub element 1. The taper bore 19 insures a taper friction drive fit upon the hub when the rim 18 is drawn up tight on the tapered, balanced, split hub, by means of the cap screws 20, which extend through suitable openings 21 in the collar 17 and are threaded into the openings 22 in the flange 2 of the hub element 1.

Tapped holes 23 may be provided, located in the hub 17 of the rim 18. When it is desired to remove the rim element from the hub, the cap screws 20 may be removed and threaded into said tapped holes 23 in the rim hub 18. The pressure exerted by the threading of these cap screws 20 into and through the rim collar 17 and against the hub element will force the rim collar 17 from its position upon the hub element 1, with a minimum of effort and trouble.

It will be understood that the invention is not to be limited to the specific construction or arrangement of parts shown, but that they may be widely modified within the invention defined by the claim.

What is claimed is:

In a demountable sheave structure for use in a power transmission drive, a hub having its outer surface tapered for at least a part of its length and being split longitudinally on one of its radii to allow easy mounting and accurate positioning of the hub upon a shaft, means for clamping the hub in fixed position upon a shaft, an annular flange formed upon the inner end of the hub and provided with a plurality of threaded cap screw receiving openings, a demountable rim, a hub engaging collar carried by the rim and having a tapered bore for fitting over the tapered portion of the hub, said collar having smooth unthreaded cap screw receiving openings therein for receiving cap screws for threading into the threaded openings in the flange to draw the rim upon the hub and provide a press fit of the rim and hub upon a shaft, said collar provided with threaded cap screw openings for receiving cap screws for forcing engagement against said flange to force the rim off the hub.

WALTER W. KEMPHERT.
D. E. TESSENDORF.